(12) United States Patent
Kobayashi et al.

(10) Patent No.: US 6,991,579 B2
(45) Date of Patent: Jan. 31, 2006

(54) TOROIDAL TYPE CONTINUOUSLY VARIABLE TRANSMISSION

(75) Inventors: Norihisa Kobayashi, Kanagawa (JP); Shinji Miyata, Kanagawa (JP); Takashi Imanishi, Kanagawa (JP); Hideki Hashitani, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/271,729

(22) Filed: Oct. 17, 2002

(65) Prior Publication Data

US 2003/0078133 A1    Apr. 24, 2003

(30) Foreign Application Priority Data

Oct. 19, 2001    (JP) ............................. 2001-322335

(51) Int. Cl.
*F16H 15/38*    (2006.01)

(52) U.S. Cl. .......................................... 476/42; 476/45
(58) Field of Classification Search ................ 476/40, 476/42, 45, 46
See application file for complete search history.

(56) References Cited

U.S. PATENT DOCUMENTS

| 4,186,616 | A | * | 2/1980 | Sharpe | ........................ 476/10 |
| 4,229,986 | A | * | 10/1980 | Sharpe | ........................ 476/65 |
| 5,033,322 | A | | 7/1991 | Nakano | |
| 5,144,850 | A | * | 9/1992 | Hibi | ........................... 476/48 |
| 5,569,112 | A | | 10/1996 | Fukushima | |
| 5,651,750 | A | | 7/1997 | Imanishi et al. | |
| 6,071,210 | A | | 6/2000 | Kato et al. | |
| 6,206,801 | B1 | | 3/2001 | Ishikawa et al. | |
| 6,248,039 | B1 | | 6/2001 | Hibi | |
| 6,312,356 | B1 | * | 11/2001 | Greenwood | .................. 476/40 |
| 6,408,518 | B1 | | 6/2002 | Kumagae et al. | |

FOREIGN PATENT DOCUMENTS

| JP | 2-283949 | 11/1990 |
| JP | 6-14604 | 2/1994 |
| JP | 6-37222 | 9/1994 |
| JP | 6-280957 | 10/1994 |
| JP | 8-4869 | 1/1996 |
| JP | 8-61453 | 3/1996 |
| JP | 9-88988 | 3/1997 |

(Continued)

OTHER PUBLICATIONS

Nikkei Mechanical vol. 564, (Sep. No. 2001), pp. 76-77, published by Nikkei Business Publications Inc., Sep. 1, 2001, is discussed on p. 8 in the specification for the above application.

*Primary Examiner*—David Fenstermacher
(74) *Attorney, Agent, or Firm*—Sughrue Mion, PLLC (57) ABSTRACT

A toroidal type continuously variable transmission having first and second discs supported around a rotating shaft and receiving power rollers therebetween includes a ball spline having a first spline groove formed in an outer circumferential surface of the rotating shaft, a second spline groove formed in an inner circumferential surface of the first disc, and balls provided between the first spline groove and the second spline groove rollably. An axial position of an end portion of an effective groove portion of the first spline groove is located to correspond to an axial position of an inner end portion of the second spline groove or more closely to the second disc than the axial position thereof when a pressing unit, a preload spring and the first disc are installed around the rotating shaft, pressure oil is not fed to the pressing unit, and the preload spring is not elastically deformed.

5 Claims, 6 Drawing Sheets

FOREIGN PATENT DOCUMENTS

| | | |
|---|---|---|
| JP | 10-159926 | 6/1998 |
| JP | 11-51135 | 2/1999 |
| JP | 2595141 | 3/1999 |
| JP | 11-141564 | 5/1999 |
| JP | 11-182644 | 7/1999 |
| JP | 11-241754 | 9/1999 |
| JP | 11-247953 | 9/1999 |
| JP | 2000-18350 | 1/2000 |
| JP | 2000-199553 | 7/2000 |
| JP | 2000-213610 | 8/2000 |
| JP | 2000-233367 | 8/2000 |
| JP | 2000-240748 | 9/2000 |
| JP | 2000-291756 | 10/2000 |
| JP | 2001-027298 | 1/2001 |
| JP | 2001-124165 | 5/2001 |

\* cited by examiner

TOROIDAL TYPE CONTINUOUSLY VARIABLE TRANSMISSION

BACKGROUND OF THE INVENTION

1. Field of the Invention

The present invention relates to a toroidal type continuously variable transmission, which is used as a transmission unit constituting an automobile automatic transmission unit or as a transmission for regulating the running speed of various industrial machines such as a pump.

2. Description of the Related Art

Figure 3:
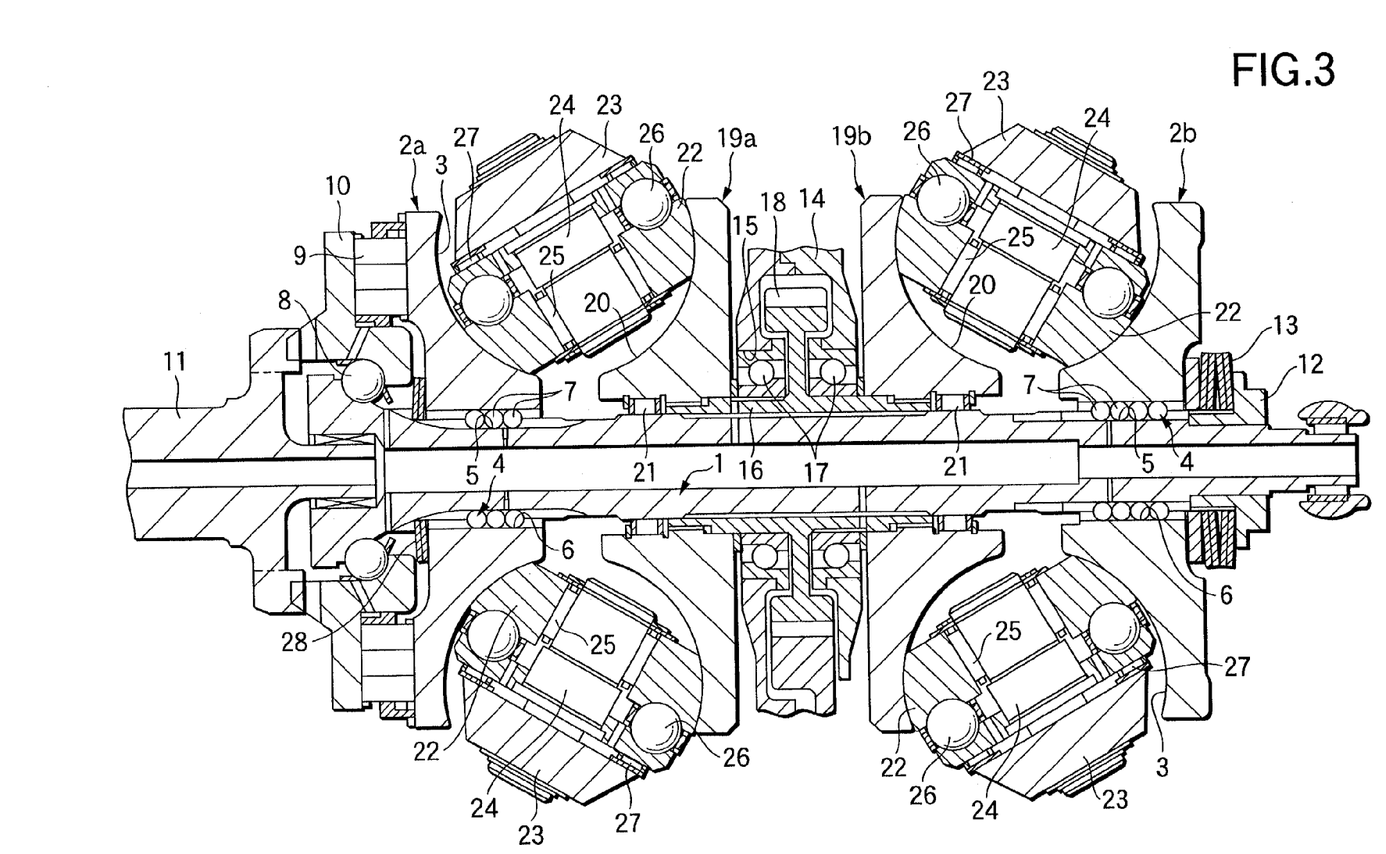
FIG. 3 is a sectional view of an example of the basic configuration of a toroidal type continuously variable transmission known broadly in the related art.

Toroidal type continuously variable transmissions have been known as a kind of transmission unit constituting an automobile transmission. Some toroidal type continuously variable transmissions have been put into practical use. Such toroidal type continuously variable transmissions already put into practical use are heretofore known well as disclosed in a large number of official gazettes such as U.S. Pat. No. 5,033,322, U.S. Pat. No. 5,569,112 and U.S. Pat. No. 5,651,750. A basic structure of such a toroidal type continuously variable transmission will be described with reference to FIG. 3. The structure shown in FIG. 3 is a so-called double-cavity type in which power transmission from an input portion to an output portion is carried out by two systems separated in parallel with each other. In contrast, a so-called single-cavity type toroidal type continuously variable transmission in which power transmission is carried out by only one system is also known well as disclosed in a large number of official gazettes. In the case of the double-cavity type toroidal type continuously variable transmission shown in FIG. 3, an input-side disc 2a which is a first disc is supported around an input-side rotating shaft 1 in a portion close to the base end (to the left of FIG. 3) with respect to an intermediate portion of the input-side rotating shaft 1. The input-side rotating shaft 1 corresponds to a rotating shaft. On the other hand, the other input-side disk 2b is supported around the input-side rotating shaft 1 in a portion close to its forward end (to the right of FIG. 3). The input-side discs 2a and 2b are supported through ball splines 4 and 4 so that input-side inner side surfaces 3 and 3 which are toroidal surfaces respectively are opposed to each other. Accordingly, both the input-side discs 2a and 2b are supported around the input-side rotating shaft 1 displaceably in the axial direction of the input-side rotating shaft 1 and rotatably in sync with the input-side rotating shaft 1.

Each of the ball splines 4 and 4 is formed by providing a plurality of balls 7 and 7 between first and second spline grooves 5 and 6 rollably. The first spline grooves 5 and 5 are formed in the outer circumferential surface of the input-side rotating shaft 1 respectively. On the other hand, the second spline grooves 6 and 6 are formed in the inner circumferential surfaces of the input-side discs 2a and 2b respectively. In addition, a rolling bearing 8 and a loading cam style pressing unit 9 are provided between the base end portion of the input-side rotating shaft 1 and the outer side surface of the input-side disc 2a which is a first disc. Then, a cam plate 10 constituting the pressing unit 9 can be driven to rotate desirably by a drive shaft 11. On the other hand, a loading nut 12 and a coned disk spring 13 having great elastic force are provided between the forward end portion of the input-side rotating shaft 1 and the outer side surface of the other input-side disc 2b.

The intermediate portion of the input-side rotating shaft 1 penetrates a through hole 15 provided in a partition portion 14 provided in a casing receiving the toroidal type continuously variable transmission. A cylindrical sleeve 16 is supported on the inner diameter side of the through hole 15 rotatably by a pair of rolling bearings 17 and 17. An output gear 18 is fixedly provided on the outer circumferential surface of an intermediate portion of the sleeve 16. In addition, output-side discs 19a and 19b are supported on opposite end portions of the sleeve 16 which project from the opposite outer side surfaces of the partition portion 14, respectively. The output-side discs 19a and 19b are made rotatable in sync with the sleeve 16 by spline engagement. In this state, output-side inner side surfaces 20 and 20 of the output-side discs 19a and 19b which are toroidal surfaces respectively face the input-side inner side surfaces 3 and 3 respectively. In addition, needle roller bearings 21 and 21 are provided between the outer circumferential surface of the intermediate portion of the input-side rotating shaft 1 and portions of the inner circumferential surfaces of the output-side discs 19a and 19b projecting from the edge of the sleeve 16, respectively. Thus, the needle roller bearings 21 and 21 bear loads on the output-side disks 19a and 19b respectively while allowing the output-side disks 19a and 19b to make rotation and axial displacement with respect to the input-side rotating shaft 1. Incidentally, of the output-side discs 19a and 19b, the output-side disc 19a close to the pressing unit 9 (to the left of FIG. 3) corresponds to a second disc.

In addition, a plurality (typically two or three) of power rollers 22 and 22 are disposed around the input-side rotating shaft 1 and in each space (cavity) between the input-side and output-side inner side surfaces 3 and 20. The power rollers 22 and 22 have spherically convex surfaces in their circumferential surfaces in contact with the input-side and output-side inner side surfaces 3 and 20, respectively. The power rollers 22 and 22 are supported on the inner side surface portions of trunnions 23 and 23 through displacement shafts 24 and 24, radial needle roller bearings 25 and 25, thrust ball bearings 26 and 26, and thrust needle roller bearings 27 and 27 so as to be allowed to make rotation and slight swinging displacement. That is, the displacement shafts 24 and 24 are eccentric shafts each having a base half portion and a forward half portion eccentric to each other. Then, the base half portions of the displacement shafts 24 and 24 are supported on the intermediate portions of the trunnions 23 and 23 through other radial needle roller bearings (not shown) so as to be allowed to make swinging displacement, respectively.

The power rollers 22 and 22 are supported rotatably on the forward half portions of the displacement shafts 24 and 24 through the radial needle roller bearings 25 and 25 and the thrust ball bearings 26 and 26, respectively. In addition, the displacements of the power rollers 22 and 22 with respect to the axial direction of the input-side rotating shaft 1, which are based on the elastic deformations of the respective constituent members, are allowed desirably by the other radial needle roller bearings and the thrust needle roller bearings 25 and 25, respectively. Further, the trunnions 23 and 23 are supported displaceably clockwise and counterclockwise in FIG. 3 by pivot shafts provided in their opposite end portions (in the front/back direction of FIG. 3), respectively. At the same time, the trunnions 23 and 23 are made displaceable in the axial direction (the front/back direction of FIG. 3) of the pivot shafts by actuators (not shown), respectively. In this connection, the pivot shafts are arranged in a physical relationship such that the pivot shafts extend on a plane perpendicular to the center axes of the input-side discs 2a and 2b and the output-side discs 19a and 19b but does not intersect the center axes thereof. Such a physical relationship is referred to as "twisted position".

When the toroidal type continuously variable transmission configured thus is operated, the input-side disc 2a corresponding to the first disc is driven to rotate by the drive shaft 11 through the pressing unit 9. The pressing unit 9 drives and rotates the input-side disc 2a while generating axial thrust. Accordingly, the pair of input-side discs 2a and 2b including the input-side disc 2a rotate synchronously with each other while being pressed toward the output-side discs 19a and 19b, respectively. As a result, the rotations of the input-side discs 2a and 2b are transmitted to the output-side discs 19a and 19b through the power rollers 22 and 22 respectively. Thus, the output gear 18 linked with the output-side discs 19a and 19b through the sleeve 16 is rotated.

When the toroidal type continuously variable transmission is operated, the surface pressures in respective contact portions between the circumferential surfaces of the power rollers 22 and 22 and the input-side and output-side inner side surfaces 3 and 20 are secured by the thrust generated by the pressing unit 9. In addition, the greater the power (torque) transmitted from the drive shaft 11 to the output gear 18 is, the higher the surface pressures are. Accordingly, excellent transmission efficiency can be obtained regardless of the change of the torque. In addition, even when the torque to be transmitted is 0 or slight, the surface pressures in the respective contact portions are secured to some extent by a preload spring 28 provided on the inner diameter side of the pressing unit 9. Thus, the torque transmission in the respective contact portions is carried out smoothly without excessive slippage on and after the start-up of the toroidal type continuously variable transmission.

When the gear ratio between the drive shaft 11 and the output gear 18 is changed, the trunnions 23 and 23 are displaced in the front/back direction of FIG. 3 by actuators (not shown). In this case, the trunnions 23 and 23 in the upper half portion of FIG. 3 and the trunnions 23 and 23 in the lower half portion of FIG. 3 are displaced in the directions opposite to each other and by the same quantity. With this displacement, the directions of forces applied tangentially to the contact portions between the circumferential surfaces of the power rollers 22 and 22 and the input-side and output-side inner side surfaces 3 and 20 are changed respectively. Then, the tangential forces make the trunnions 23 and 23 swing around the pivot shafts provided in their opposite end portions, respectively. With the swinging motions, the contact portions between the circumferential surfaces of the power rollers 22 and 22 and the input-side and output-side inner side surfaces 3 and 20 change their positions with respect to the radial directions of the inner side surfaces 3 and 20, respectively. As the contact portions are displaced to the axial outside of the input-side inner side surface 3 and to the axial inside of the output-side inner side surface 20 respectively, the gear ratio is changed to the speed increasing side. On the contrary, as the contact portions are displaced to the axial inside of the input-side inner side surface 3 and to the axial outside of the output-side inner side surface 20 respectively, the gear ratio is changed to the speed reducing side.

In the case of the related-art structure, a mechanical loading cam unit is used as the pressing unit 9 for securing surface pressures in the respective contact portions between the circumferential surfaces of the power rollers 22 and 22 and the input-side and output-side inner side surfaces 3 and 20. In the case of such a mechanical pressing unit 9, the surface pressures can be indeed adjusted in accordance with the torque to be transmitted, but the surface pressures cannot be adjusted in accordance with any other element. In order to further improve the transmission efficiency and the durability of the toroidal type continuously variable transmission, it can be, for example, considered that the surface pressures are changed in accordance with the change of temperature causing the change of viscosity of traction oil. Further, in order to realize a continuously variable transmission unit in which a toroidal type continuously variable transmission and a planetary gear mechanism are used in combination, it is necessary to adjust the surface pressures in accordance with not only torque but also other elements.

For example, as such a continuously variable transmission unit, a continuously variable transmission unit called a power split type, which can improve the transmission efficiency and the durability at the time of high speed operation dramatically, has been known in the related art as disclosed in not only a large number of patent publications but also the technical magazine "Nikkei Mechanical" Vol. 564 (September Number 2001), pp. 76–77, published by Nikkei Business Publications Inc., Sep. 1, 2001. In addition, a continuously variable transmission unit called a geared neutral type has been also known in the related art as disclosed in a large number of patent publications. In the geared neutral transmission unit, a toroidal type continuously variable transmission and a planetary gear mechanism are used in combination so that the rotational velocity of an output shaft can be reduced to zero while an input shaft is left rotating. In the case of such a continuously variable transmission unit, mode selection among a plurality of modes including a low-speed mode and a high-speed mode is performed. In order to solve or relieve uncomfortable feeling given to a driver at the time of the mode selection, it is effective that the thrust generated by a pressing unit at the time of the mode selection is adjusted separately from the torque.

Figure 4:
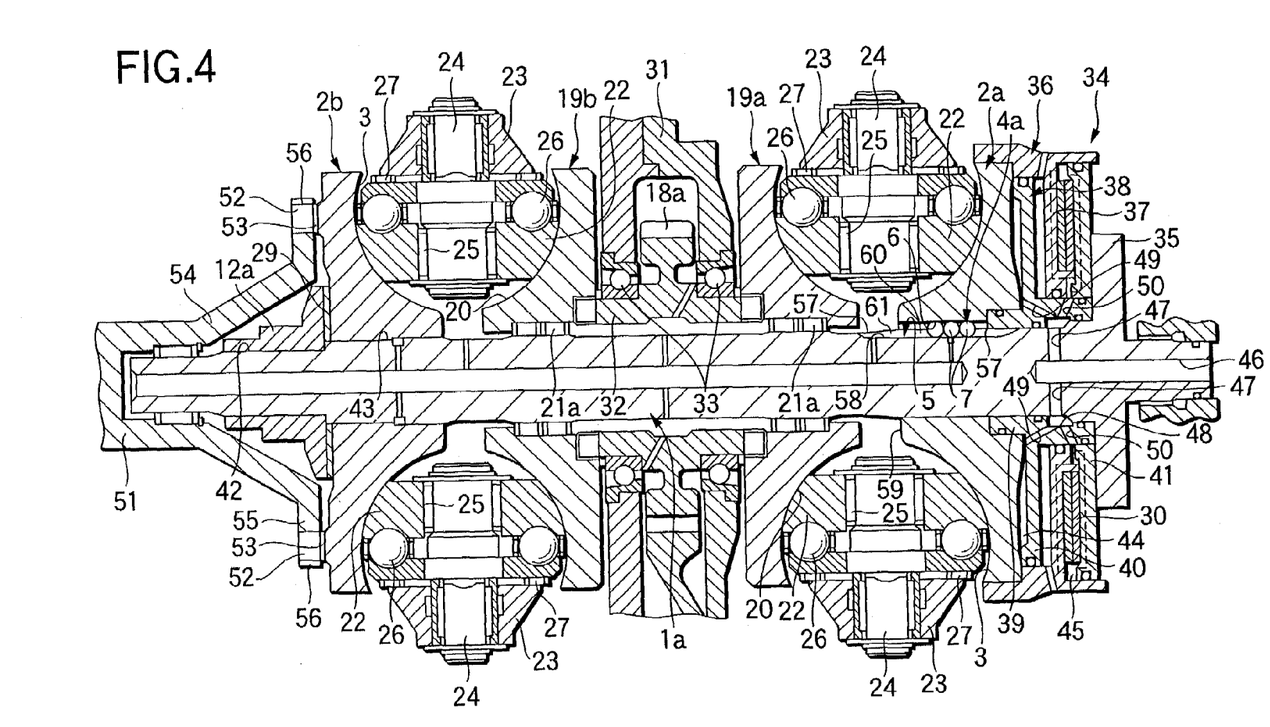
FIG. 4 is a sectional view showing an example of the structure of a toroidal type continuously variable transmission in the related art.

On such an occasion, a structure shown in FIG. 4 is effective. The invention relates to the improvement of the structure shown in FIG. 4. Therefore, first, description will be made on the structure shown in FIG. 4. The structure shown in FIG. 4 is of a double-cavity type in which a total of four power rollers are provided so that two of them are disposed between the inner side surfaces of a pair of input-side and output-side discs while the other two are disposed between the inner side surfaces of the other pair of input-side and output-side discs. On the other hand, there is also a double-cavity type structure of the invention in which a total of six power rollers are provided so that three of them are disposed between the inner side surfaces of a pair of input-side and output-side discs while the other three are disposed between the inner side surfaces of the other pair of input-side and output-side discs. However, such a structural difference is not essential to the invention. The invention is applicable not only to the structure shown in FIG. 4 but also to the structure in which a total of six power rollers are provided. Further, the invention is also applicable to a single-cavity type structure in which two or three power rollers are provided between the inner side surfaces of a pair of input-side and output-side discs.

In the case of the structure shown in FIG. 4, a pair of input-side discs 2a and 2b are supported on the opposite end portions of an input-side rotating shaft 1a corresponding to a rotating shaft, so that the input-side discs 2a and 2b can rotate synchronously with the input-side rotating shaft 1a while input-side inner side surfaces 3 and 3 of the input-side discs 2a and 2b are opposed to each other. Of them, the input-side disc 2a on the forward end side (a side more distant from a drive source and on the right of FIG. 4) corresponding to a first disc is supported on the forward end portion of the input-side rotating shaft 1a through a ball spline 4a displaceably axially and rotatably in sync with the input-side rotating shaft 1a. On the other hand, the input-side disc 2b on the base end side (a side closer to the drive source and on the left of FIG. 4) is fixed to the input-side rotating shaft 1a in the following manner. That is, in the state in which the input-side disc 2b is spline-engaged with the base end portion of the input-side rotating shaft 1a, the back surface of the input-side disc 2b is held down by a loading nut 12a. Incidentally, a shim plate 29 is sandwiched between the loading nut 12a and the input-side disc 2b. As the shim plate 29, one with a proper thickness selected from a plurality of kinds of shim plates different in thickness is used to adjust the elastic force of a coned disk spring 30 corresponding to a preload spring. The coned disk spring 30 is built in a hydraulic pressing unit, which will be described later, so as to provide preload.

Then, a pair of output-side discs 19a and 19b are supported around the intermediate portion of the input-side rotating shaft 1a and between the pair of input-side discs 2a and 2b so that the output-side discs 19a and 19b can rotate synchronously with each other while output-side inner side surfaces 20 and 20 of the output-side discs 19a and 19b are opposed to the input-side inner side surfaces 3 and 3 of the input-side discs 2a and 2b. In addition, power rollers 22 and 22 are sandwiched between the input-side inner side surfaces 3 of the input-side discs 2a and 2b and the output-side inner side surfaces 20 of the output-side discs 19a and 19b, respectively, so as to be supported rotatably on the inner side surfaces of trunnions 23 and 23. In the case of the structure shown in FIG. 4, the structure for supporting the power rollers 22 and 22 on the inner side surfaces of the trunnions 23 and 23 respectively and the structure for supporting the trunnions 23 and 23 swingably and axially displaceably in a casing are the same as structures well known in the related art, including the structure shown in FIG. 3, as will be described later.

In addition, an output sleeve 32 is disposed inside a casing (not shown) provided for receiving the toroidal type continuously variable transmission and on the inner diameter side of a gear housing 31 provided between the pair of output-side discs 19a and 19b so as to be supported rotatably by a pair of rolling bearings 33 and 33. Then, an output gear 18a fixedly provided on the outer circumferential surface of the intermediate portion of the output sleeve 32 is supported rotatably in the gear housing 31. In addition, curved engagement in the radial direction is made between the axially opposite edge portions of the output sleeve 32 and near-to-inner circumference portions of the outer side surfaces of the output-side discs 19a and 19b so as to link the output-side discs 19a and 19b with the output gear 18a rotatably in sync with each other, respectively. In addition, needle roller bearings 21a and 21a are provided between the inner circumferential surfaces of the output-side discs 19a and 19b and the outer circumferential surface of the intermediate portion of the input-side rotating shaft 1a, respectively. Thus, the output-side discs 19a and 19b are supported around the input-side rotating shaft 1a rotatably with respect to the input-side rotating shaft 1a and displaceably in the axial direction thereof.

In addition, the power rollers 22 and 22 disposed around the input-side rotating shaft 1a and two by two between the input-side and output-side inner side surfaces 3 and 20 are supported on the inner side surface portions of the trunnions 23 and 23 through displacement shafts 24 and 24, radial needle roller bearings 25 and 25, thrust ball bearings 26 and 26, and thrust needle roller bearings 27 and 27 so as to be allowed to make rotation and slight swinging displacement, respectively. Further, the trunnions 23 and 23 are supported displaceably clockwise and counterclockwise in FIG. 4 by pivot shafts provided in their opposite end portions, and displaceably in the axial directions of the pivot shafts by actuators (not shown), respectively. Then, the circumferential surfaces of the power rollers 22 and 22 are brought into contact with the input-side and output-side inner side surfaces 3 and 20 of the discs 2a, 2b, 19a and 19b respectively. In addition, a hydraulic pressing unit 34 is installed between the input-side disc 2a on the forward end side and the input-side rotating shaft 1a so as to secure the surface pressures in the contact portions (traction portions) between the inner side surfaces 3 and 20 and the circumferential surfaces of the power rollers 22 and 22. Thus, the power can be transmitted efficiently by the toroidal type continuously variable transmission.

To construct the pressing unit 34, an outward flange portion 35 is fixedly provided in a near-to-forward end portion of the outer circumferential surface of the input-side rotating shaft 1a. In addition, a cylinder 36 is oil-tightly outer-fitted to the input-side-disc 2a on the forward end side. Thus, the cylinder 36 is supported to project axially from the outer side surface (right surface in FIG. 4) of the input-side disc 2a. The inner diameter of the cylinder 36 is smaller in its axially intermediate portion and larger in its opposite end portions. The input-side disc 2a is inner-fitted to the base-end-side larger diameter portion of the cylinder 36 oil-tightly and axially displaceably. In addition, an inward-flange-like partition plate portion 37 is provided on the inner circumferential surface of the intermediate portion of the cylinder 36. Further, a first piston member 38 is provided between the inner circumferential surface of the cylinder 36 and the outer circumferential surface of the input-side rotating shaft 1a.

In the first piston member 38, an outward-flange-like partition plate 40 is formed on the outer circumferential surface of the intermediate portion of a support cylinder portion 39 which can be outer-fitted to the input-side rotating shaft 1a. The outer circumferential edge of the partition plate 40 is made to abut and slide on the smaller-diameter portion of the intermediate portion of the inner circumferential surface of the cylinder 36 oil-tightly and axially displaceably. In addition, in this state, the inner circumferential edge of the partition plate portion 37 is made to abut and slide on the outer circumferential surface of the support cylinder portion 39 oil-tightly and axially displaceably. Further, a ring-like second piston member 41 is provided between the outer circumferential surface of the forward end portion of the support cylinder portion 39 and the inner circumferential surface of the forward end portion of the cylinder 36. The second piston member 41 brings its forward-end-side side surface into contact with the outward flange portion 35 so as to prevent axial displacement, while keeping oil tightness between the inner circumferential edge of the second piston member 41 and the outer circumferential surface of the forward end portion of the support cylinder portion 39 and between the outer circumferential edge of the second piston member 41 and the inner circumferential surface of the forward end portion of the cylinder 36.

In addition, the cylinder 36 provided with the partition plate portion 37 is pressed onto the input-side disc 2a by a coned disk spring 30 provided between the partition plate portion 37 and the second piston member 41. Accordingly, the input-side disc 2a is pressed by at least the pressing force corresponding to the elastic force of the coned disk spring 30 (even if pressure oil has not been introduced into the pressing unit 34). Thus, surface pressure corresponding to the elastic force is applied to the contact portions between the input-side and output-side inner side surfaces 3 and 20 and the circumferential surfaces of the power rollers 22 and 22. Thus, the elastic force is regulated not to produce slippage (excluding unavoidable spin) in the contact portions between the input-side and output-side inner side surfaces 3 and 20 and the circumferential surfaces of the power rollers 22 and 22 when very small power is transmitted by the toroidal type continuously variable transmission.

The elastic force of the coned disk spring 30 is adjusted for such a purpose. The adjustment is carried out by changing the thickness of the shim plate 29 sandwiched between the loading nut 12a and the input-side disc 2b. That is, the outer diameter of a male thread portion 42 formed in the base end portion of the input-side rotating shaft 1a in order to screw down the loading nut 12a is smaller than the outer diameter of a first spline portion 43 locking up the input-side disc 2b. Accordingly, there is a step between the first spline portion 43 and the male thread portion 42. When the toroidal type continuously variable transmission is assembled, the loading nut 12a is screwed down to the male thread portion 42 till it abuts against the step, and further secured. In this state, as the shim plate 29, one with a proper thickness is selectively used to set the elastic force of the coned disk spring 30 at a value proper to provide preload. Incidentally, the thickness of the shim plate 29 is selected to prevent the coned disk spring 30 from being completely compressed (prevent the coned disk spring 30 from being perfectly flat) in the state in which the loading nut 12a has been secured. Accordingly, there is no fear that the surface pressures in the contact portions between the input-side and output-side inner side surfaces 3 and 20 and the circumferential surfaces of the power rollers 22 and 22 become excessive as the loading nut 12a is secured. Hence, damage such as impressions on those surfaces can be surely prevented from being caused.

In addition, oil pressure is introduced desirably into a first oil pressure chamber 44 and a second oil pressure chamber 45 through a central hole 46 of the input-side rotating shaft 1a. The first oil pressure chamber 44 is provided between the partition plate 40 and the input-side disc 2a, and the second oil pressure chamber 45 is provided between the second piston member 41 and the partition plate portion 37. To this end, the deep end portion of the central hole 46 and the outer circumferential surface of the intermediate portion of the input-side rotating shaft 1a are brought into communication with each other through branch holes 47 and 47 formed radially in the intermediate portion of the input-side rotating shaft 1a. In addition, an annular recess portion 48 is formed all over the circumference of a portion of the inner circumferential surface of the support cylinder portion 39 corresponding to the outer-diameter-side openings of the branch holes 47 and 47. Further, first and second communication holes 49 and 50 are provided so that their one ends communicate with the annular recess portion 48 while the other ends communicate with the first and second oil pressure chambers 44 and 45 respectively. On the other hand, the central hole 46 communicates with an oil pressure source such as a pressure pump (not shown) through an oil pressure control valve (not shown). When the toroidal type continuously variable transmission is operated, oil pressure controlled by the oil pressure control valve in accordance with the magnitude of power to be transmitted or the state of mode selection is introduced into the first and second oil pressure chambers 44 and 45 so as to press the input-side disc 2a. Thus, surface pressures corresponding to the magnitude of power to be transmitted or the state of mode selection are given to the contact portions between the input-side and output-side inner side surfaces 3 and 20 and the circumferential surfaces of the power rollers 22 and 22 respectively.

Further, in the illustrated example, the rotational force is transmitted from a drive shaft 51 to the input-side rotating shaft 1a through the input-side disc 2b supported on the base end portion of the input-side rotating shaft 1a. To this end, a plurality of protrusion portions 52 and 52 are provided to project over a half portion of the outer side surface (left surface in FIG. 4) of the input-side disc 2b radially closer to the outer diameter portion of the outer side surface than to the central portion thereof. The protrusion portions 52 and 52 are formed into arcs respectively, and disposed intermittently and at an equal interval on the same arc around the central axis of the input-side disc 2b. Then, lock notch portions 53 and 53 are formed between circumferential end surfaces of circumferentially adjacent ones of the protrusion portions 52 and 52. To say other words, short cylindrical portions provided to project over the outer side surface of the input-side disc 2b are removed at an equal interval so as to form the lock notch portions 53 and 53. Thus, the protrusion portions 52 and 52 are formed between circumferentially adjacent ones of the lock notch portions 53 and 53.

On the other hand, a transmission flange 55 is provided in the forward end portion of the drive shaft 51 through a transmission cylinder portion 54 shaped like a conical cylinder. Then, transmission projections 56 and 56 equal in number to the lock notch portions 53 and 53 are circumferentially formed in the outer circumferential edge portion of the transmission flange 55 at an equal interval. Then, the transmission projections 56 and 56 and the lock notch portions 53 and 53 are engaged with each other so that torque can be transmitted between the input-side disc 2b and the drive shaft 51. The diameter of each of engagement portions between the transmission projections 56 and 56 and the lock notch portions 53 and 53 is large enough so that sufficiently large torque can be transmitted desirably between the drive shaft 51 and the input-side disc 2b.

The basic operation for the toroidal type continuously variable transmission having a structure formed the above to transmit power between the drive shaft 51 and the output gear 18a is similar to that for a toroidal type continuously variable transmission which is known broadly in the related art including the structure shown in FIG. 3. Particularly, in the case of the toroidal type continuously variable transmission shown in FIG. 4, the hydraulic pressing unit 34 is used. Accordingly, the surface pressures in the contact portions between the input-side and output-side inner side surfaces 3 and 20 and the circumferential surfaces of the power rollers 22 and 22 can be controlled not only in accordance with the torque to be transmitted but also in accordance with the temperature or the state of mode selection of a continuously variable transmission unit in which the toroidal type continuously variable transmission has been incorporated. Accordingly, not only is it possible to further improve the efficiency of the toroidal type continuously variable transmission but it is also possible to make control to suppress a sudden change of elastic deformation quantity in each constituent member caused by mode selection so as to suppress the fluctuation of the gear ratio caused by the sudden change.

When the structure shown in FIG. 4 is assembled, the work of assembling the ball spline 4a for supporting the input-side disc 2a in the forward end portion of the input-side rotating shaft 1a becomes troublesome unless the shapes of the respective portions are devised. Accordingly, the manufacturing cost of the toroidal type continuously variable transmission increases. Description about this reason will be made with reference to FIGS. 5A and 5B and FIG. 6 as well as FIG. 4.

Figure 5A:
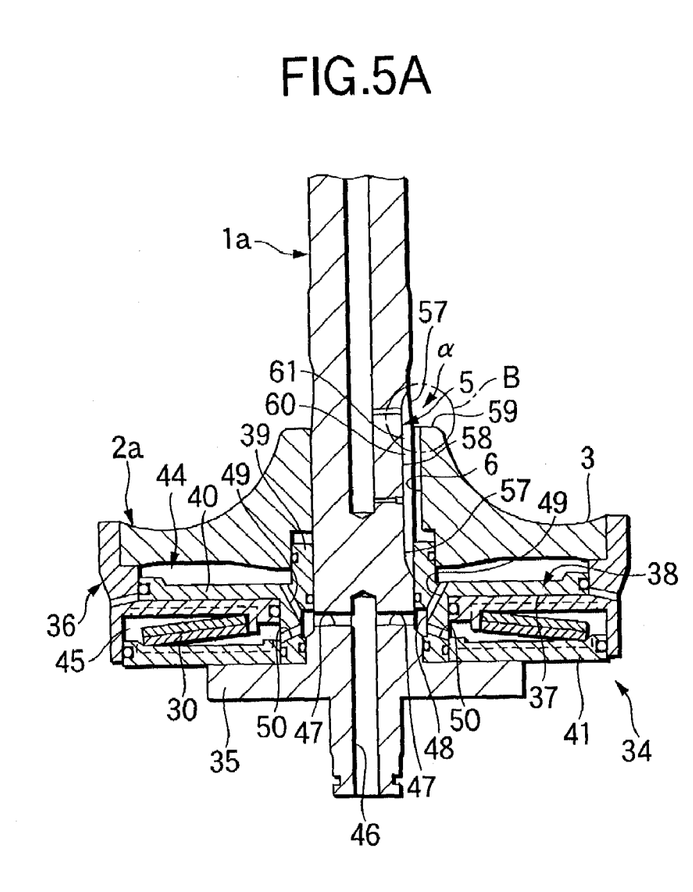
FIGS. 5A and 5B are sectional views showing a main portion in association with the invention extracted from the structure shown in FIG. 4, FIG. 5A showing the state in which a preload spring is left free, FIG. 5B showing the state in which the preload spring is compressed.

When the toroidal type continuously variable transmission shown in FIG. 4 is assembled, the constituent members of the hydraulic pressing unit 34, that is, the cylinder 36, the first and second piston members 38 and 41, and the coned disk spring 30 are assembled in advance. Then, the hydraulic pressing unit 34 is outer-fitted to the inside portion of the outward flange portion 35 in the forward end portion of the input-side rotating shaft 1a. Next, as shown in FIG. 5A, the input-side disc 2a is outer-fitted to a near-to-forward end portion of the input-side rotating shaft 1a, while the outer circumferential edge portion of the input-side disc 2a is inner-fitted to the cylinder 36. After the respective members 1a, 36, 38, 41 and 30 are assembled as shown in FIG. 5A, the balls 7 and 7 constituting the ball spline 4a are incorporated between the first spline groove 5 formed in a near-to-forward end portion of the outer circumferential surface of the input-side rotating shaft 1a and the second ball spline groove 6 formed in the inner circumferential surface of the input-side disc 2a.

This assembling work is carried out upon the respective members as shown in FIG. 5A in the state where the forward end portion of the input-side rotating shaft 1a is placed on the lower side and the input-side rotating shaft 1a is set to erect. Then, as shown by the arrow α, the balls 7 and 7 are inserted between the spline grooves 5 and 6 from the opening portion (upper opening) on the side of an inner end surface 59 of the input-side disc 2a and on the side of the center of the input-side rotating shaft 1a. Accordingly, to carry out the assembling work of the ball spline 4a smoothly, the width of an upper end opening portion 61 of a space 60 surrounded by the spline grooves 5 and 6 has to be larger than the diameter of each of the balls 7 and 7.

Figure 6:
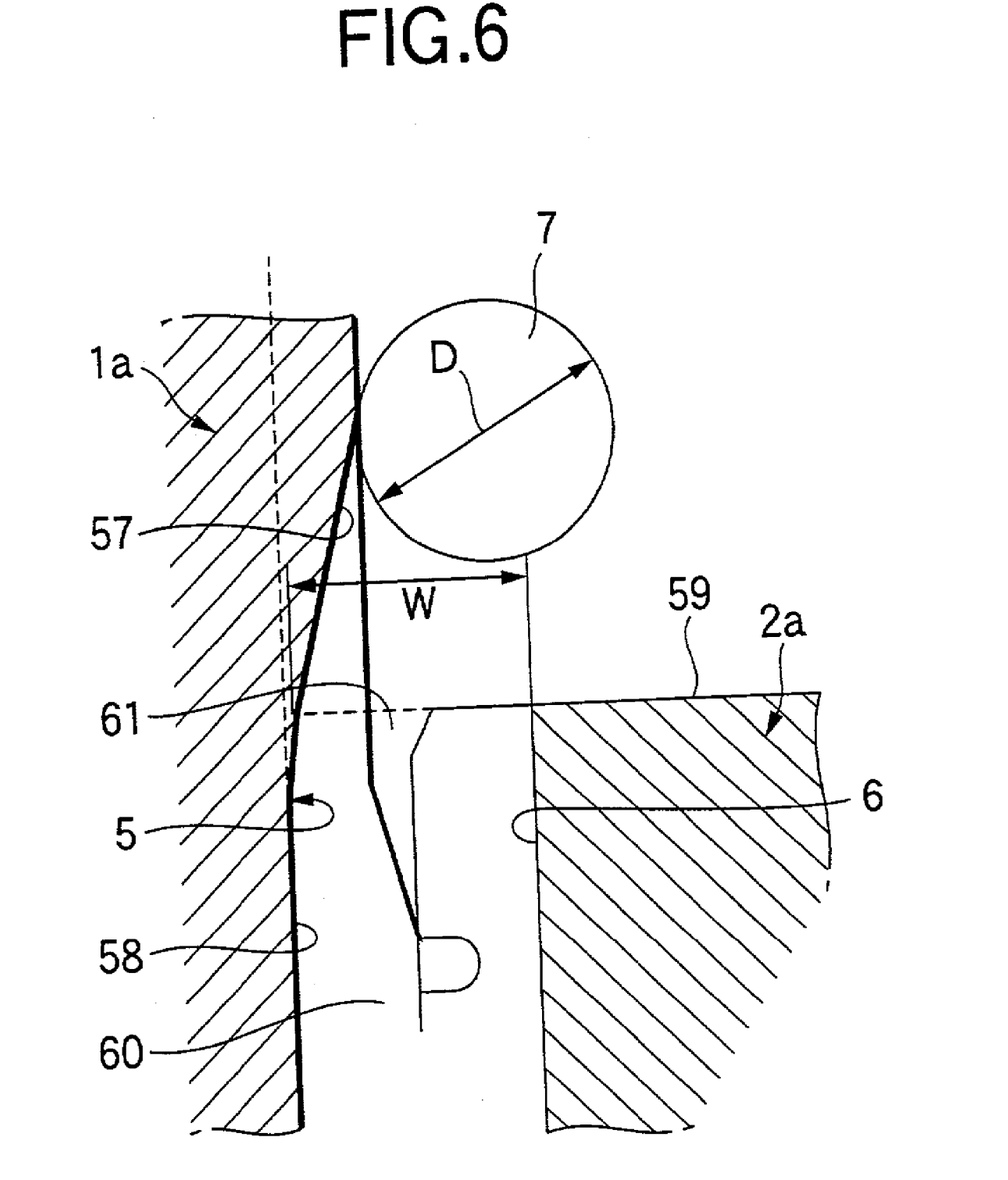
FIG. 6 is an enlarged view of portion B of FIG. 5A.

On the other hand, the opposite end portions of the first spline groove 5 formed in a near-to-forward end portion of the outer circumferential surface of the input-side rotating shaft 1a are imperfect grooves 57 and 57 getting shallower gradually as shown in FIG. 5A. The portion between the imperfect groove portions 57 and 57 is an effective groove portion 58 having a constant depth. When the assembling work of the ball spline 4a is carried out without compressing the coned disk spring 30 (hence with the coned disk spring 30 left free) as shown in FIG. 5A, the inner end surface 59 of the input-side disc 2a is located comparatively closely to the center of the input-side rotating shaft 1a. In this state, when the axial position of the inner end surface 59 is located over the imperfect groove portion 57 as shown in FIGS. 5A and 6, the width W of the upper end opening portion 61 of the space 60 becomes smaller than the diameter D of each of the balls 7 and 7 (W<D). Thus, the work of inserting the balls 7 and 7 cannot be carried out.

Figure 5B:
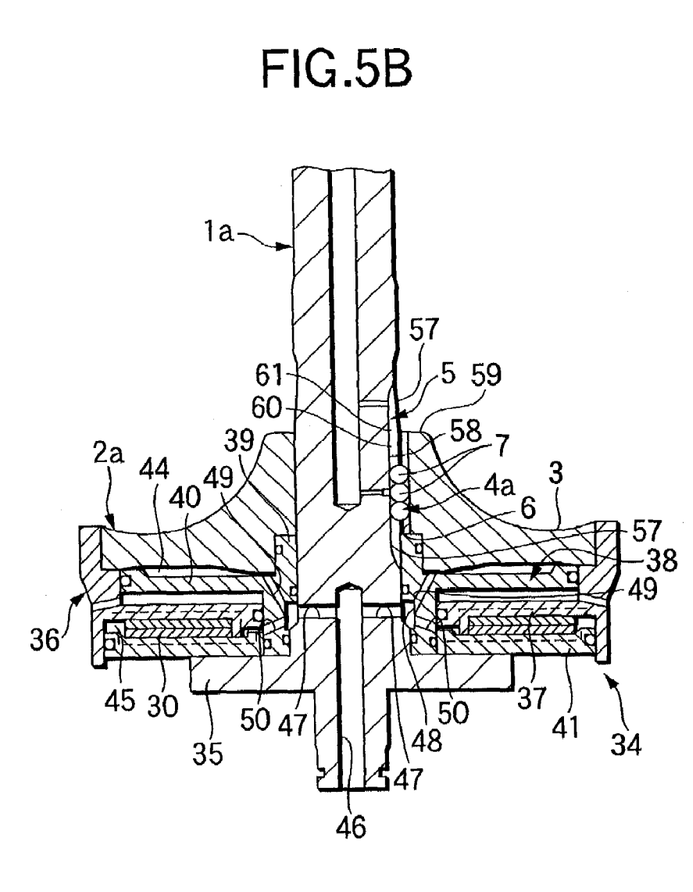

Even in this case, when the input-side disc 2a is displaced toward the forward end of the input-side rotating shaft 1a while compressing the coned disk spring 30 elastically as shown in FIG. 5B, the inner end surface 59 can be moved to the effective groove portion 58 of the first spline groove 5. Thus, the work of inserting the balls 7 and 7 can be carried out. However, large force, for example, about 9.8 kN (1 tf) is required for compressing the coned disk spring 30. It is therefore troublesome to carry out the work of inserting the balls 7 and 7 while compressing the coned disk spring 30. Thus, cost required for the assembling work is increased undesirably.

SUMMARY OF THE INVENTION

A toroidal type continuously variable transmission according to the invention was developed in consideration of such circumstances.

It is an object of the invention to provide a toroidal type continuously variable transmission in which balls constituting a ball spline can be incorporated easily.

To attain the foregoing object, a toroidal type continuously variable transmission according to the invention includes a rotating shaft, a first disc, a second disc, a plurality of trunnions, displacement shafts, power rollers, a hydraulic pressing unit, a preload spring, and a ball spline.

The first disc has an inner side surface and is supported around the rotating shaft displaceably in an axial direction of the rotating shaft and rotatably in sync with the rotating shaft.

The second disc has an inner side surface opposed to the inner side surface of the first disc. The second disc is disposed concentrically with the first disc and rotatably independently of the first disc.

The trunnions are provided between the first and second discs so as to swing around pivot shafts located in screw positions with respect to central axes of the two discs, respectively.

The displacement shafts project from inner side surfaces of the trunnions.

The power rollers are sandwiched between the inner side surfaces of the two discs so as to be supported on the displacement shafts rotatably, respectively.

The hydraulic pressing unit is provided between the rotating shaft and the first disc and for pressing the first disc toward the second disc in accordance with pressure oil fed to the pressing unit.

The preload spring is provided between the rotating shaft and the first disc and for pressing the first disc toward the second disc even when the pressing unit is not operated.

The ball spline supports the first disc displaceably in the axial direction of the rotating shaft and rotatably in sync with the rotating shaft.

Particularly, in the toroidal type continuously variable transmission according to the invention, the ball spline includes a first spline groove, a second spline groove, and balls. The first spline groove is formed in an outer circumferential surface of the rotating shaft. The second spline groove is formed in an inner circumferential surface of the first disc. The balls are provided between the first spline groove and the second spline groove rollably.

Further, an axial position of an end portion of an effective groove portion of the first spline groove is located to correspond to an axial position of an inner end portion of the second spline groove or more closely to the second disc than the axial position of the inner end portion when the pressing unit, the preload spring and the first disc are installed around the rotating shaft, pressure oil is not fed to the pressing unit, and the preload spring is not elastically deformed.

The hydraulic pressing unit may include at least one piston member.

In the toroidal type continuously variable transmission configured thus according to the invention, balls constituting a ball spline can be incorporated easily between a first spline groove formed in the outer circumferential surface of a rotating shaft and a second spline groove formed in the inner circumferential surface of a first disc particularly without compressing a preload spring.

DETAILED DESCRIPTION OF THE INVENTION

Figure 1A:
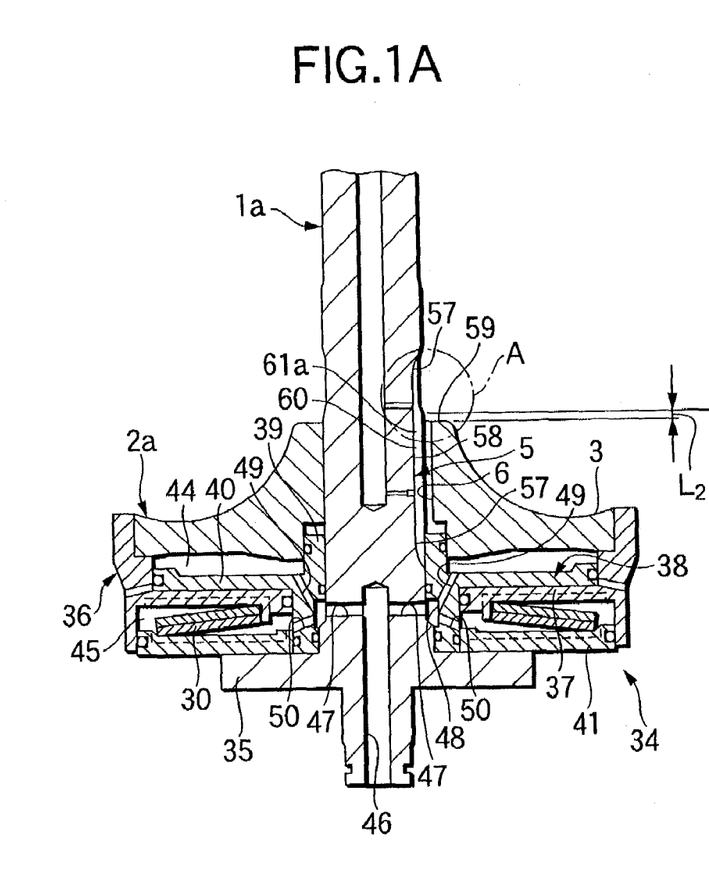
FIGS. 1A and 1B are main portion sectional views showing an embodiment of the invention, FIG. 1A showing the state in which a preload spring is left free, FIG. 1A showing the state in which the preload spring is compressed.
Figure 1B:
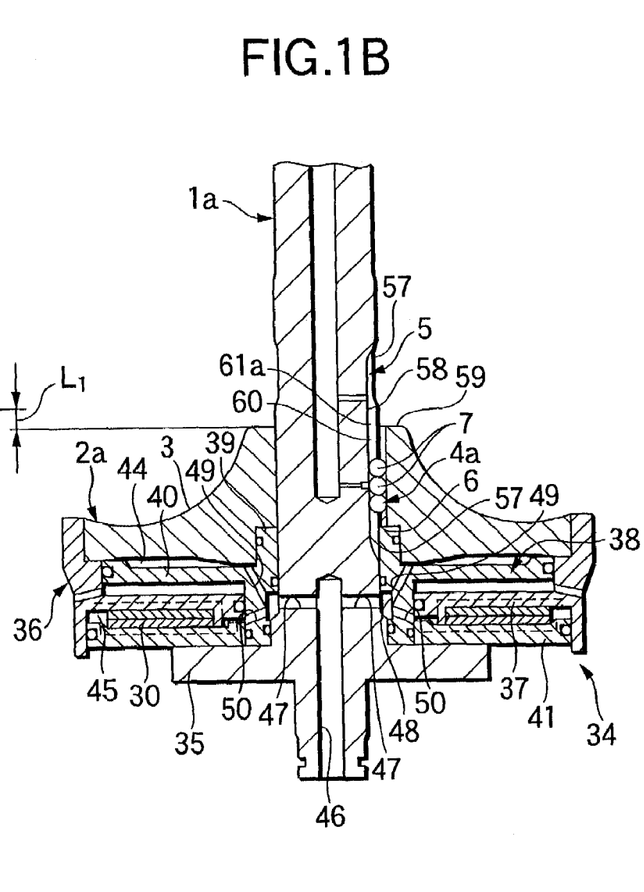
Figure 2:
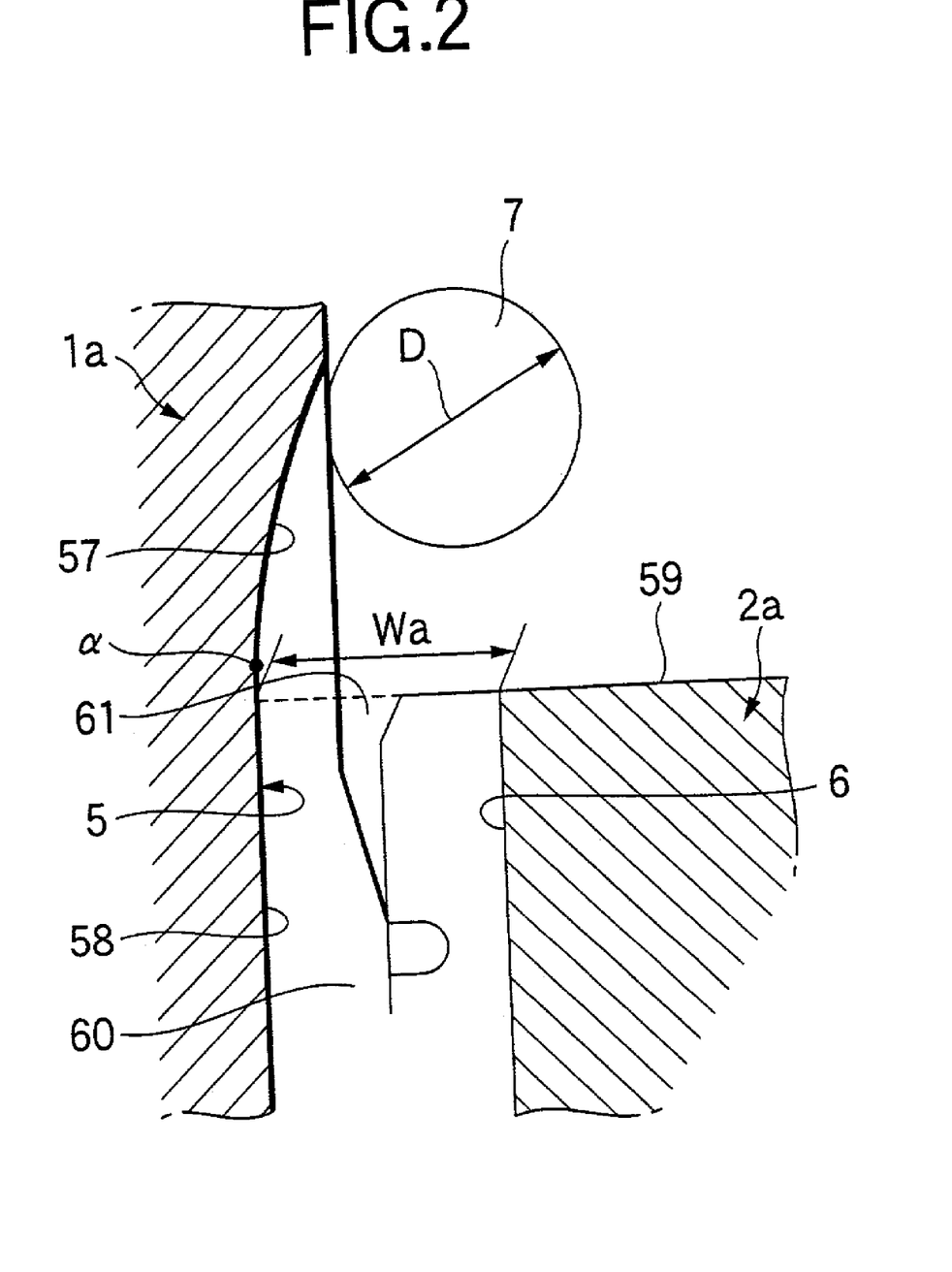
FIG. 2 is an enlarged view of portion A of FIG. 1A.

FIGS. 1A and 1B and FIG. 2 show an embodiment of the invention. Incidentally, this embodiment has a feature in that the dimensions of a first spline groove 5 formed in the outer circumferential surface of the forward end portion of an input-side rotating shaft 1a which is a rotating shaft is regulated by the relationship to an input-side disc 2a which is a first disc, when the work of inserting balls 7 and 7 between the first spline groove 5 and a second spline groove 6 formed in the inner circumferential surface of the input-side disc 2a is to be made easy. The configurations and operations of the other members are similar to those in the structure shown in FIG. 4. Therefore, illustration and description about those equivalent members will be omitted or simplified, and characteristic portions of the invention will be described chiefly below.

As shown in FIG. 1A, constituent members of a hydraulic pressing unit 34 assembled in advance in order to assemble a toroidal type continuously variable transmission, that is, a cylinder 36, first and second piston members 38 and 41, and a coned disk spring 30 are outer-fitted to the inside of an outward flange portion 35 in the forward end portion of the input-side rotating shaft 1a. Further, the input-side disc 2a is outer-fitted to a near-to-forward end portion of the input-side rotating shaft 1a, while the outer circumferential edge portion of the input-side disc 2a is inner-fitted to the cylinder 36. In this state, pressure oil is not fed to first and second oil pressure chambers 44 and 45 of the pressing unit 34, and the coned disk spring 30 is left free without being compressed. Accordingly, the input-side disc 2a is displaced (pushed upward) to the central portion of the input-side rotating shaft 1a by the elastic force of the coned disk spring 30. After the respective members 1a, 36, 38, 41 and 30 have been assembled as shown in FIG. 1A, balls 7 and 7 constituting a ball spline 4a for supporting the input-side disc 2a on the input-side rotating shaft 1a are incorporated between a first spline groove 5 formed in a near-to-forward end portion of the outer circumferential surface of the input-side rotating shaft 1a, and a second spline groove 6 formed in the inner circumferential surface of the input-side disc 2a.

In order to form the ball spline 4a in the state where the respective constituent members have been assembled as shown in FIG. 1A in the case of the toroidal type continuously variable transmission according to the invention, the axial position α of the end portion (border between an effective groove portion 58 and an imperfect groove portion 57) of the effective groove portion 58 of the first spline groove 5 formed in the outer circumferential surface of the input-side rotating shaft 1a is located more closely to the center (upper side in FIG. 1) of the input-side rotating shaft 1a than the axial position of an inner end surface 59 of the input-side disc 2a corresponding to the inner end portion of the second spline groove 6 formed in the inner circumferential surface of the input-side disc 2a, as shown in FIG. 2.

Incidentally, assume that a large thrust load toward the forward end portion of the input-side rotating shaft 1a is applied to the input-side disc 2a so that the coned disk spring 30 is compressed and brought into the state of completion of assembling the toroidal type continuously variable transmission (the state where the circumferential surfaces of the power rollers 22 and 22 have been pressed onto the input-side inner side surface 3 of the input-side disc 2a as shown in FIG. 4), as shown in FIG. 1B. In this case, the inner end surface 59 of the input-side disc 2a corresponding to the inner end portion of the second spline groove 6 is located around a near-to center portion of the effective groove portion 58 of the first spline groove 5. In this state, the axial distance between the end portion of the effective groove portion 58 and the inner end surface 59 is $L_1$. This axial distance $L_1$ is larger than the compressed width of the coned disk spring 30, that is, a stroke $L_2$ of the input-side disc 2a between the state where the coned disk spring 30 is left free and the state where the assembling is completed ($L_1 > L_2$).

At any rate, in the case of the toroidal type continuously variable transmission according to this embodiment, the inner end surface 59 of the input-side disc 2a is located around the effective groove portion 58 of the first spline groove 5 in the state where the coned disk spring 30 is left free, that is, in the state where the input-side disc 2a is displaced closely to the center of the input-side rotating shaft 1a by the coned disk spring 30. Accordingly, width $W_a$ of an upper-end opening portion 61a of a space 60 between the first spline groove 5 and the second spline groove 6 becomes equal to the diameter D of each of the balls 7 and 7 or larger than the diameter D ($W_a \geq D$). Thus, the work of inserting the balls 7 and 7 into the space 60 can be carried out easily.

Incidentally, in the illustrated embodiment, description has been made on the case in which the pressing unit 34 having the first and second piston members 38 and 41 installed is used so as to be capable of generating large thrust compared with the diameter. However, the invention may be applied to a hydraulic pressing unit in which only one piston is incorporated. Further, the invention may be applied to a single-cavity type toroidal type continuously variable transmission as described above.

While only certain embodiments of the invention have been specifically described herein, it will apparent that numerous modifications may be made thereto without departing from the sprit and scope of the invention.

Since the invention is configured and operated as described above, surface pressures in contact portions between inner side surfaces of input-side and output-side discs and circumferential surfaces of power rollers can be adjusted rapidly into optimum values in accordance with running conditions. In addition, since the work of assembling a small-size and light-weight toroidal type continuously variable transmission is made easy, the invention can contribute to realization of such a toroidal type continuously variable transmission.

What is claimed is:

1. A toroidal type continuously variable transmission comprising:
 a rotating shaft;
 a pair of first discs each having an inner side surface and supported around said rotating shaft displaceably in an axial direction of said rotating shaft and rotatably in sync with said rotating shaft;
 a second disc having an inner side surface opposed to said inner side surface of one of said first discs and disposed concentrically with said first disc and rotatably independently of said first discs;
 a plurality of trunnions provided between said first and second discs so as to swing around pivot shafts located in twisted positions with respect to central axes of said two discs, respectively;
 displacement shafts projecting from inner side surfaces of said trunnions;
 power rollers sandwiched between said inner side surfaces of said first and second discs so as to be supported on said displacement shafts rotatably, respectively;
 a hydraulic pressing unit provided between said rotating shaft and said one of said first discs and for pressing said one of said first discs toward said second disc in accordance with pressure oil fed to said pressing unit;
 a preload spring provided between said rotating shaft and said one of said first discs and for pressing said one of said first discs toward said second disc even when said pressing unit is not operated; and
 a ball spline for supporting said one of said first discs displaceably in said axial direction of said rotating shaft and rotatably in sync with said rotating shaft,
 wherein said ball spline includes a first spline groove formed in an outer circumferential surface of said rotating shaft, a second spline groove formed in an inner circumferential surface of said one of said first discs, and balls provided between said first spline groove and said second spline groove rollably; and
 wherein an axial position of an end portion of an effective groove portion of said first spline groove is located so as to correspond to an axial position of an inner end portion of said second spline groove or is located more closely to said second disc than is said axial position of said inner end portion, wherein the locations of said effective groove portion and said inner end portion are determined when said pressing unit, said preload spring and said one of said first discs are installed around said rotating shaft, pressure oil is not fed to said pressing unit, and said preload spring is not elastically deformed.

2. The toroidal type continuously variable transmission according to claim 1, wherein said hydraulic pressing unit includes at least one piston member.

3. The toroidal type continuously variable transmission according to claim 1, wherein said first spline groove has said effective groove portion having a constant depth, and imperfect groove portions getting gradually shallower from opposite end portions of said effective groove.

4. The toroidal type continuously variable transmission according to claim 1, wherein the preload spring is provided in the hydraulic pressing unit.

5. The toroidal type continuously variable transmission according to claim 1, wherein the hydraulic pressing unit comprises a first piston and a second piston.

* * * * *